Nov. 18, 1947.  H. T. KRAFT  2,430,936
FRICTION FACING FOR CONE BRAKES
Filed Dec. 14, 1944  2 Sheets-Sheet 1

INVENTOR.
Herman T. Kraft
BY
Evans + McCoy
ATTORNEYS

Patented Nov. 18, 1947

2,430,936

UNITED STATES PATENT OFFICE 2,430,936

FRICTION FACING FOR CONE BRAKES

Herman T. Kraft, Akron, Ohio, assignor to The General Tire & Rubber Company, Akron, Ohio, a corporation of Ohio Application December 14, 1944, Serial No. 568,182

6 Claims. (Cl. 188—218)

This invention relates to torque transmitting friction elements such as employed in clutches and brakes, and more particularly to a detachable friction facing for the cone brakes of airplane landing wheels.

An important object of the invention is to provide an annular, metallic friction facing element including an annular adapting ring of tapering form, so constructed that it will not be distorted when subjected to heat by reason of its having a coefficient of expansion different from the member to which it is attached.

A further object of the invention is to provide a friction facing element in the form of a circumferentially continuous annulus which is so constructed that it is sufficiently flexible to conform to the surface to which it is attached.

A further object of the invention is to provide a conical, wear resistant friction facing that may be readily detached and replaced with a new facing.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
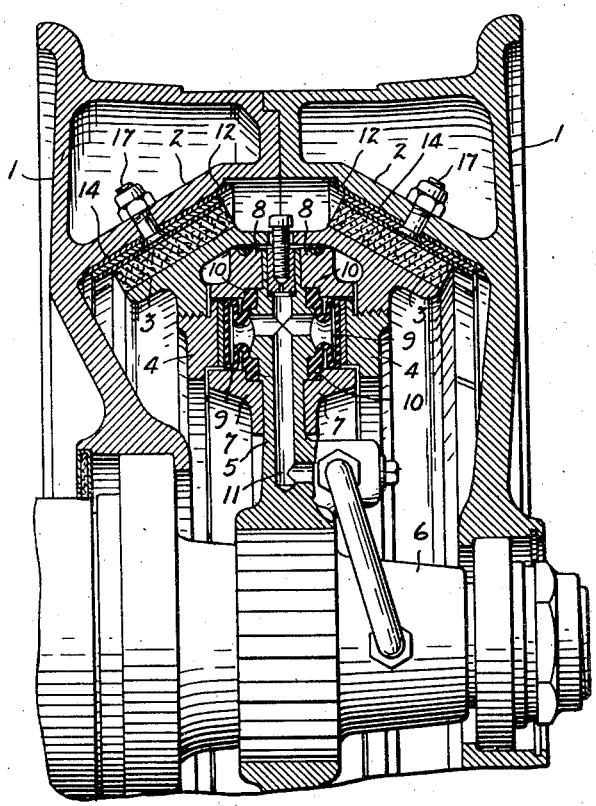
Fig. 1 is a fragmentary transverse section through an airplane landing wheel to which the invention is applied.
Figure 2:
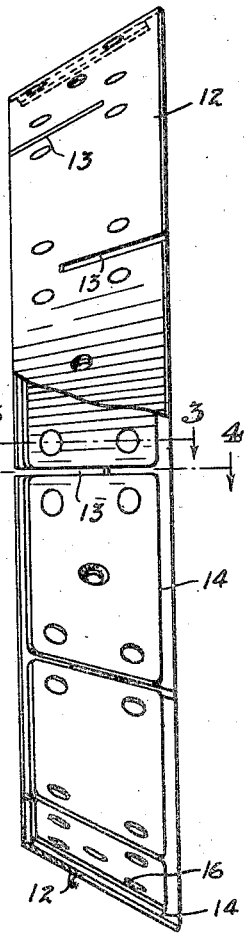
Fig. 2 is an edge view of the detachable friction facing ring with a portion broken away to show part of the interior surface of the ring.
Figures 3, 4:
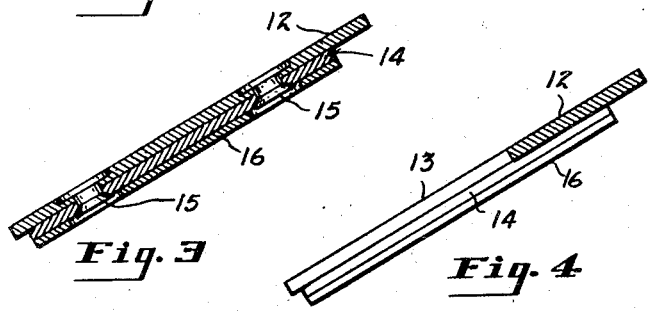
Fig. 3 is a section taken on the line indicated at 3—3 in Fig. 2.
Fig. 4 is a section taken on the line indicated at 4—4 in Fig. 2.
Figure 5:
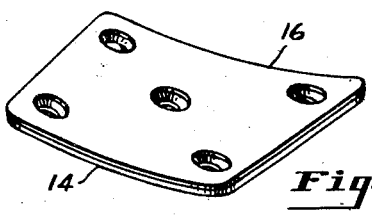
Fig. 5 is a perspective view of one of the metal friction blocks.
Figure 6:
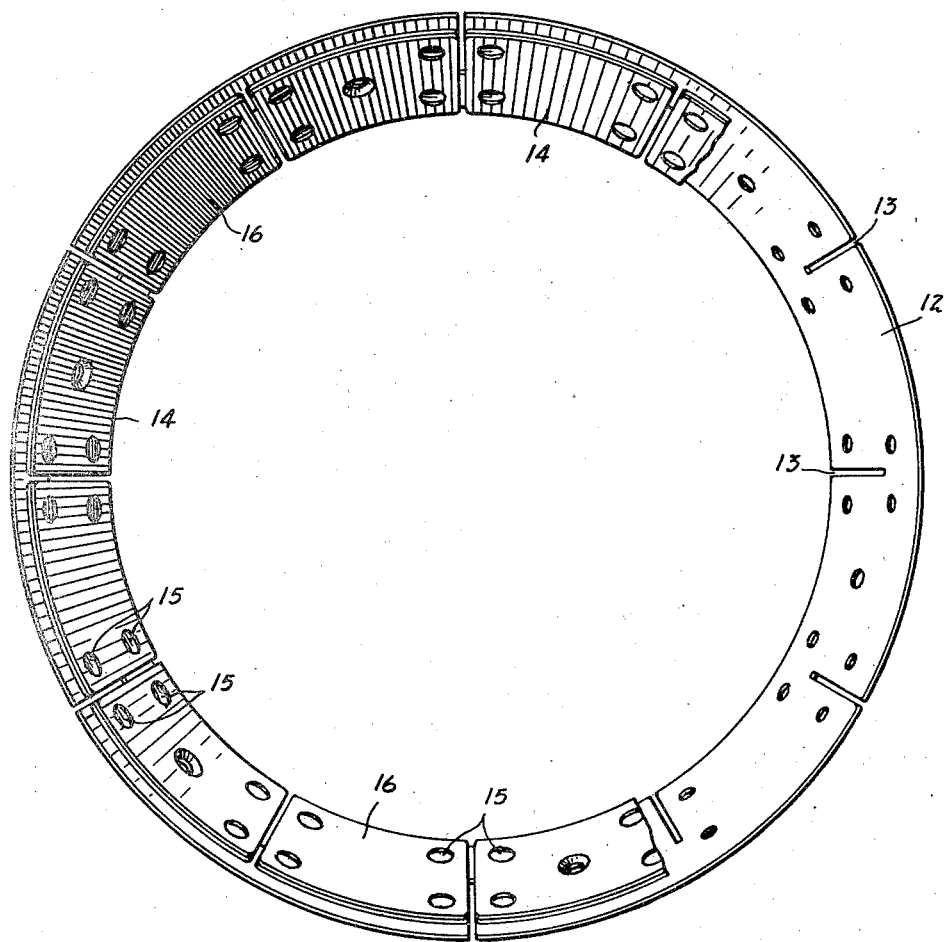
Fig. 6 is a side elevation of the friction facing ring with some of the friction blocks omitted to show the structure of the adapter ring to which the blocks are attached.

In the accompanying drawings, the invention is shown applied to an airplane landing wheel brake of the type disclosed in my copending application, Serial No. 480,906, March 29, 1943, now Patent No. 2,386,477, Oct. 9, 1945. The wheel body 1 is formed of aluminum or magnesium castings and has interior webs 2 of conical form which serve as brake members. Within the webs 2 a pair of axially movable conical shoes 3 are mounted, the shoes 3 being adjustably mounted upon rings 4 which are disposed upon opposite sides of a central disc 5 attached to a quill 6 carried by the wheel axle. The inner portions of the rings 4 extend into annular spaces between inner and outer concentric rings 7 and 8 attached to opposite faces of the disc body. The inner faces of the rings 4 are engaged by inflatable glands 9 that are formed of flexible material such as rubber and which are anchored to the disc 5 by means of beads 10 that are clamped between the rings 7 and 8 and the disc 5. Fluid under pressure may be delivered to the glands 9 through a fluid passage 11 in the disc 5 to apply outward pressure simultaneously to the rings 4 so as to force the shoes 3 against the webs 2.

In order to obtain efficient braking action and to provide a brake of good wearing qualities, it is desirable that the webs 2 have a facing of suitable wear resistant material having suitable friction characteristics. The friction facing of the present invention comprises a frusto-conical sheet steel adapter ring 12 which is made flexible by means of circumferentially spaced, radially disposed slots 13. The slots 13 are preferably equiposed angularly spaced and successive slots throughout the circumference of the ring open to opposite side edges of the ring. The slots 13 extend at least half way across the ring and preferably somewhat more than half way across so that the adapter ring will have sufficient flexibility to accommodate itself to the conical surface to which it is applied, and will be capable of expansion and contraction independently of its support so that it will not be distorted by heat generated therein during service.

The adapter ring 12 provides support for closely spaced steel friction blocks 14 which are of a size to fit in the spaces between successive slots 13, each block 14 being attached to the adapter ring 12 by rivets 15 and so spaced throughout the circumference of the ring that the slots 13 lie in the spaces between the blocks 14. The blocks 14 may be provided with a plating 16 in the form of a copper alloy having desirable friction characteristics. The ring 12 is attached to the webs 2 by means of screws or bolts 17 that are disposed centrally of alternate blocks 14, and that extend through the blocks 14, the ring 12 and webs 2.

By reason of the flexible construction of the adapter ring 12 the ring will readily conform to supporting surfaces differing slightly in taper and the slots 13 between points of attachment of the ring will permit expansion of the metal of the ring due to heat without distortion of the ring.

It is to be understood that variations and modifications of the specific device herein shown and described for purposes of illustration, may be made without departing from the spirit of the invention.

What I claim is:

1. In a device of the character described a member having an annular tapering face, a sheet metal adapter ring shaped to conform to said annular face, said adapter ring having spaced transverse slots extending partially across the same from each of its side edges, the slots opening to one edge being intermediate slots opening to the opposite edge, means for attaching the adapter ring to said member at circumferentially spaced points, and friction blocks secured to said adapter ring intermediate its slots.

2. In a device of the character described a member having an internal annular tapering face, a sheet metal adapter ring shaped to conform to said annular face, said adapter ring having regularly spaced axially extending slots opening to each side edge thereof, the slots opening to one edge being substantially midway between slots opening to the opposite edge thereof and all of said slots extending at least half way across said adapter ring, bolts attaching said adapter ring to said member at spaced points, and friction blocks secured to said adapter ring between the slots thereof.

3. In a device of the character described, a wheel having a web of frusto-conical form, a sheet metal adapter ring shaped to conform to the interior of said web, transverse slots in said adapter ring opening to the inner and outer edges thereof and extending partially across the same, the slots opening to one edge being substantially midway between slots opening to the other edge, friction blocks mounted on said adapter ring between the slots thereof, and circumferentially spaced bolts attaching the adapter ring to said web.

4. In a wheel brake, a wheel body having a web of frusto-conical form, a sheet metal adapter ring shaped to fit within said web, regularly spaced transverse slots in said ring opening alternately to opposite side edges of the ring and each extending at least half way across the ring, brake blocks mounted on the ring in the spaces between successive slots, and means for attaching said ring to said web at points centrally of certain of said spaces between successive slots.

5. In a wheel brake, a wheel body having a web of frusto-conical form, a sheet metal adapter ring shaped to fit within said web, regularly spaced transverse slots in said ring opening alternately to opposite side edges of the ring and each extending at least half way across the ring, metal brake blocks shaped to conform to the interior of said adapter ring and of a length substantially corresponding to the spaces between successive slots, means for securing said blocks to said ring, and means for attaching said ring at spaced points to said web.

6. A friction facing for a rigid metal member having a conical face comprising a frusto-conical sheet metal adapter ring having transverse slots regularly spaced throughout its circumference, successive slots opening to opposite edges of the ring and each slot extending at least half way across the ring, and spaced friction blocks mounted on the ring, one in each of the spaces between the slots thereof.

HERMAN T. KRAFT.

REFERENCES CITED

The following references are of record in the file of this patent:

UNITED STATES PATENTS

| Number | Name | Date |
| --- | --- | --- |
| 2,109,722 | Fawick | Mar. 1, 1938 |
| 1,907,483 | Blume | May 9, 1933 |